United States Patent
Sugita et al.

(10) Patent No.: US 10,615,419 B2
(45) Date of Patent: *Apr. 7, 2020

(54) POSITIVE ELECTRODE FOR NONAQUEOUS ELECTROLYTE SECONDARY BATTERIES, AND NONAQUEOUS ELECTROLYTE SECONDARY BATTERY

(71) Applicant: SANYO Electric Co., Ltd., Daito-shi, Osaka (JP)

(72) Inventors: Yasunari Sugita, Kadoma (JP); Tomoki Shiozaki, Osaka (JP); Kazuki Endo, Kadoma (JP)

(73) Assignee: SANYO Electric Co., Ltd., Daito-shi (JP)

( * ) Notice: Subject to any disclaimer, the term of this patent is extended or adjusted under 35 U.S.C. 154(b) by 169 days.

This patent is subject to a terminal disclaimer.

(21) Appl. No.: 15/822,946

(22) Filed: Nov. 27, 2017

(65) Prior Publication Data

US 2018/0076463 A1 Mar. 15, 2018

Related U.S. Application Data

(63) Continuation of application No. 14/773,940, filed as application No. PCT/JP2014/001373 on Mar. 11, 2014, now Pat. No. 9,859,564.

(30) Foreign Application Priority Data

Mar. 11, 2013 (JP) .................................. 2013-047846

(51) Int. Cl.
| | |
|---|---|
| *H01M 4/62* | (2006.01) |
| *H01M 4/36* | (2006.01) |
| *H01M 4/505* | (2010.01) |
| *H01M 4/525* | (2010.01) |
| *H01M 4/13* | (2010.01) |
| *H01M 10/0525* | (2010.01) |
| *H01M 4/02* | (2006.01) |

(52) U.S. Cl.
CPC ............. *H01M 4/628* (2013.01); *H01M 4/13* (2013.01); *H01M 4/366* (2013.01); *H01M 4/505* (2013.01); *H01M 4/525* (2013.01); *H01M 4/623* (2013.01); *H01M 4/625* (2013.01); *H01M 10/0525* (2013.01); *H01M 2004/028* (2013.01)

(58) Field of Classification Search
CPC ........ H01M 4/628; H01M 4/366; H01M 4/13; H01M 2004/028; H01M 10/0525; H01M 4/625; H01M 4/623; H01M 4/505; H01M 4/525

See application file for complete search history.

(56) References Cited

U.S. PATENT DOCUMENTS

| | | | |
|---|---|---|---|
| 6,733,927 B1 | 5/2004 | Takezawa et al. | |
| 2006/0251965 A1 | 11/2006 | Nagayama et al. | |
| 2007/0148555 A1* | 6/2007 | Fukaya | H01M 10/0569 |
| | | | 429/331 |
| 2008/0318133 A1 | 12/2008 | Matsuyama et al. | |
| 2012/0003514 A1 | 1/2012 | Tsujikawa et al. | |
| 2014/0138572 A1* | 5/2014 | Lee | C09K 21/00 |
| | | | 252/74 |

FOREIGN PATENT DOCUMENTS

| | | |
|---|---|---|
| JP | 2005-50755 A | 2/2005 |
| JP | 2009-4181 A | 1/2009 |
| JP | 2009-16106 A | 1/2009 |
| JP | 2009-64715 A | 3/2009 |
| JP | 2009064715 A * | 3/2009 |
| JP | 2010-15932 A | 1/2010 |
| JP | 4804686 B2 | 11/2011 |
| WO | 2010/101180 A1 | 9/2010 |

OTHER PUBLICATIONS

International Preliminary Report on Patentability (Form PCT/IB/373) issued in counterpart International Application No. PCT/JP2014/001373 dated Sep. 24, 2015 (8 pages).
International Search Report dated May 13, 2014, issued in counterpart International Application No. PCT/JP2014/001373 (2 pages).
Translation of Written Opinion dated May 15, 2014 issued in counterpart International Application No. PCT/JP2014/001373 (5 pages).
Office Action dated Sep. 19, 2017, issued in counterpart Japanese Application No. 2015-505295, with English machine translation. (4 pages).

* cited by examiner

*Primary Examiner* — Muhammad S Siddiquee
(74) *Attorney, Agent, or Firm* — Westerman, Hattori, Daniels & Adrian, LLP

(57) ABSTRACT

A positive electrode for nonaqueous electrolyte secondary batteries having a positive electrode current collector and a positive electrode mixture layer that is formed on the positive electrode current collector. The positive electrode for nonaqueous electrolyte secondary batteries is: the positive electrode mixture layer comprises a first mixture layer that contains a positive electrode active material and a reaction inhibitor which inhibits a thermal reaction between the positive electrode active material and a nonaqueous electrolyte, and a second mixture layer that contains the positive electrode active material; the positive electrode is obtained by sequentially laminating the positive electrode current collector, the first and the second mixture layer in this order; and the concentration of the reaction inhibitor contained in the positive electrode mixture layer is high in the vicinity of the positive electrode current collector in comparison to that in the surface layer portion of the positive electrode mixture layer.

8 Claims, 1 Drawing Sheet

POSITIVE ELECTRODE FOR NONAQUEOUS ELECTROLYTE SECONDARY BATTERIES, AND NONAQUEOUS ELECTROLYTE SECONDARY BATTERY

CROSS-REFERENCE TO RELATED APPLICATIONS

This application is a divisional of U.S. application Ser. No. 14/773,940, filed on Sep. 9, 2015, which is a Continuation of International Application No. PCT/JP2014/001373 filed on Mar. 11, 2014 which is based upon and claims the benefit of priority from the prior Japanese Patent Application No. 2013-047846, filed on Mar. 11, 2013, the entire contents of which are incorporated herein by reference.

TECHNICAL FIELD

The present invention relates to a positive electrode for a non-aqueous electrolyte secondary battery and a non-aqueous electrolyte secondary battery using the same.

BACKGROUND ART

In a non-aqueous electrolyte secondary battery, when an internal short circuit occurs, it causes a large current in the battery, and as a result sometimes elevates the temperature inside the battery. This temperature elevation may induce a reaction between the positive electrode active material and the non-aqueous electrolytic solution. In particular, an internal short circuit due to a stress applied from the outside to a battery in a fully charged state discharges a large energy almost instantaneously to elevate the battery temperature, and this temperature elevation induces the reaction between the positive electrode active material and the non-aqueous electrolytic solution. If this reaction cannot be suppressed, the rapid elevation of the temperature is likely to occur.

Here, examples of the cause for an internal short circuit include penetration with an object having a sharp tip (e.g., a nail), the collapse of a battery due to crushing, and an impact due to falling. In the case of an internal short circuit due to penetration with a sharp object, a large amount of Joule heat is generated near the collector, and the heat induces the reaction between the positive electrode active material and the non-aqueous electrolytic solution, which is likely to cause the rapid elevation of the battery temperature. In Patent Literature 1, it is disclosed to suppress the reaction between the positive electrode active material and the non-aqueous electrolytic solution by blending a solid flame retardant agent in the positive electrode mixture or the negative electrode mixture. Further, in Patent Literature 2, it is disclosed to suppress the combustion of the battery-constituting materials by disposing a flame retardant agent layer containing a flame retardant agent on either surface of the positive electrode, the negative electrode or the separator.

CITATION LIST

Patent Literature

Patent Literature 1: Japanese Patent Laid-Open Publication No. 2009-16106
Patent Literature 2: International Publication No. WO 2010-101180

SUMMARY OF INVENTION

Technical Problem

However, in the case of the technique disclosed in Patent Literature 1, in order to suppress the rapid temperature elevation near the collector, the proportion of the flame retardant agent in the mixture is increased which results in deterioration of battery characteristics such as a deteriorated capacity and deteriorated input-output characteristics. Further, in the case of the technique disclosed in Patent Literature 2, the deterioration of battery characteristics occurs because a flame retardant agent layer is not present near the collector, which provides no flame retardant effect against large heat generation in the collector, and instead the flame retardant agent layer is present in the surface layer side of the positive electrode and the negative electrode.

It is an object of the present invention to provide a positive electrode for a non-aqueous electrolyte secondary battery which suppresses the reaction between the positive electrode active material and the non-aqueous electrolytic solution, and has excellent input-output characteristics, and a non-aqueous electrolyte secondary battery using the same.

Solution to Problem

A positive electrode for a non-aqueous electrolyte secondary battery according to the present invention comprises a positive electrode current collector and a positive electrode mixture layer formed on the positive electrode current collector, the positive electrode mixture layer comprises a first mixture layer containing a positive electrode active material and a reaction inhibitor to suppress a thermal reaction between the positive electrode active material and a non-aqueous electrolyte, and a second mixture layer comprising the positive electrode active material, and the positive electrode is formed of the positive electrode current collector, the first mixture layer and the second mixture layer stacked in this order, wherein a concentration of the reaction inhibitor contained in the positive electrode mixture layer near the positive electrode current collector is higher than that in a surface layer portion of the positive electrode mixture layer.

Advantageous Effects of Invention

The positive electrode for a non-aqueous electrolyte secondary battery according to the present invention and the non-aqueous electrolyte secondary battery using the same suppress the reaction between the positive electrode active material and the non-aqueous electrolytic solution, and have excellent input-output characteristics.

DESCRIPTION OF EMBODIMENT

Hereinafter, an embodiment according to the present invention will be described in detail. A non-aqueous electrolyte secondary battery according to the embodiment of the present invention, for example, has a constitution in which an electrode body and a non-aqueous electrolyte solution, which is a liquid non-aqueous electrolyte, are contained in a battery outer can, the electrode body being formed of a positive electrode and a negative electrode wound with a separator interposed therebetween, or alternatively positive electrodes and negative electrodes alternately stacked with separators interposed therebetween. Each component of the non-aqueous electrolyte secondary battery will be described in detail below.

[Positive Electrode]

Figure 1:
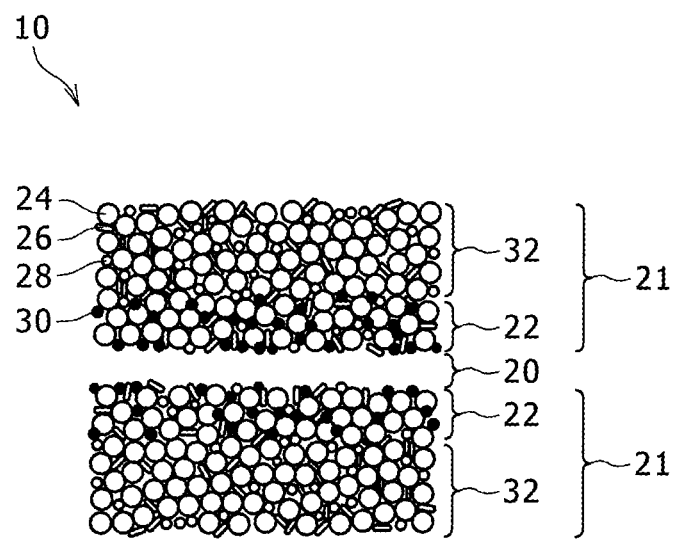
FIG. 1 is a partially sectional view of an example of a positive electrode for a non-aqueous electrolyte secondary battery according to an embodiment of the present invention.

FIG. 1 is a partially sectional view of a positive electrode 10. The positive electrode 10 is constituted of a positive electrode current collector 20 which is metal foil or the like and a positive electrode mixture layer 21 formed on the positive electrode current collector 20. For the positive electrode current collector 20, there is used a foil of a metal which is stable in the potential range of the positive electrode, a film on which a metal which is stable in the potential range of the positive electrode is disposed as a surface layer, or the like. Aluminum is suitable for use as the metal that is stable in the potential range of the positive electrode. Further, the positive electrode mixture layer 21 is constituted of a first mixture layer 22 formed on the positive electrode current collector 20 and containing a reaction inhibitor, and a second mixture layer 32 formed further thereon.

The first mixture layer 22 is a layer which contains an electrically conductive material 26, a binder 28, a reaction inhibitor 30 and the like in addition to a positive electrode active material 24, and is obtained by mixing these materials in a suitable solvent, applying the resultant mixture to the positive electrode current collector 20, drying the applied material, and then rolling the dried material.

Further, the second mixture layer 32 is a layer which contains an electrically conductive material 26, a binder 28 and the like in addition to a positive electrode active material 24, and is obtained by mixing these materials in a suitable solvent, applying the resultant mixture to the positive electrode current collector 20, drying the applied material, and then rolling the dried material. For the positive electrode active material 24, the electrically conductive material 26 and the binder 28 used for the second mixture layer 32, the same materials as those used for the first mixture layer 22 can be used.

For the positive electrode active material 24, there may be a transition metal oxide containing an alkali metal element, for example, in a particulate shape, or a transition metal oxide in which a portion of the transition metal element contained in the above-described transition metal oxide has been substituted with a different kind of element. The alkali metal element may include, for example, lithium (Li) and sodium (Na). Among these alkali metal elements, lithium is preferably used. For the transition metal element, there may be used at least one transition metal element selected from the group consisting of scandium (Sc), manganese (Mn), iron (Fe), cobalt (Co), nickel (Ni), copper (Cu), yttrium (Y) and the like. Among these transition metal elements, Mn, Co, Ni or the like is preferably used. For the different kind of element, there may be used at least one different kind of element selected from the group consisting of magnesium (Mg), aluminum (Al), zirconium (Zr), tungsten (W), molybdenum (Mo), lead (Pb), antimony (Sb), boron (B) and the like. Among these different kinds of elements, Mg, Al, Zr, W or the like is preferably used.

Specific examples of such a positive electrode active material 24 may include $LiCoO_2$, $LiNiO_2$, $LiMn_2O_4$, $LiMnO_2$, $LiNi_{1-y}Co_yO_2$, (0<y<1), $LiNi_{1-y-z}Co_yMn_zO_2$, (0<y+z<1), and $LiFePO_4$ as the lithium-containing transition metal oxides in which lithium is used as the alkali metal element. For the positive electrode active material 24, these materials may be used singly or in combinations of two or more thereof.

The electrically conductive material 26 is a powder, a particle or the like having electrical conductivity and used in order to enhance the electron conductivity of the positive electrode mixture layer 21. For the electrically conductive material 26, there is used a carbon material, a metal powder, an organic material or the like having electrical conductivity. Specifically, the electrically conductive material 26 includes acetylene black, Ketjen black, graphite and the like as the carbon materials; aluminum and the like as the metal powders; potassium titanate, titanium oxide and the like as metal oxides; and phenylene derivatives and the like as the organic materials. These electrically conductive materials 26 may be used singly or in combinations of two or more thereof.

The binder 28 is a polymer having a particulate shape or a network structure and used in order to keep a good contact state between the positive electrode active material 24 in a particulate shape and the electrically conductive material 26 in a powder or particulate shape, and to enhance bindability of the positive electrode active material 24 and the like to the surface of the positive electrode current collector 20. For the binder 28, there may be used a fluorine-containing polymer, an elastomeric polymer or the like. Specifically, the binder 28 includes polytetrafluoroethylene (PTFE), polyvinylidene fluoride (PVdF), modified materials thereof or the like as the fluorine-containing polymers; and ethylene-propylene-isoprene copolymer, ethylene-propylene-butadiene copolymer and the like as the elastomeric polymers. The binder 28 may be used together with a thickener such as carboxymethyl cellulose (CMC), polyethylene oxide (PEO) or the like.

The reaction inhibitor 30 is a powder or particles present in the first mixture layer 22 and sparingly soluble in the non-aqueous electrolytic solution, and has a function to suppress the reaction between the positive electrode active material and the non-aqueous electrolytic solution which is caused in chains by Joul heat generated in the positive electrode current collector 20. The reaction inhibitor 30 preferably coexists with the positive electrode active material 24, i.e., is fixed near the positive electrode active material 24 to remain in the positive electrode mixture layer 21. As such a reaction inhibitor 30 it is possible to use a fluoride, a phosphate ester compound, a melamine-acid salt or the like. More specifically, as a fluoride it is possible to use lithium fluoride (LiF), aluminum fluoride (AlF), as a phosphate ester compound it is possible to use an aromatic condensed phosphate ester, and as a melamine-acid salt it is possible to use melamine pyrophosphate, melamine sulfate, melamine polyphosphate, melamine cyanurate and melamine borate. In addition to these substances, any substance can be used as long as it is a substance which suppresses the reaction between the positive electrode active material and the non-aqueous electrolytic solution, such as one generally referred to as a flame retardant agent in a non-aqueous electrolyte secondary battery, and can be fixed near the positive electrode active material 24.

Figure 2:
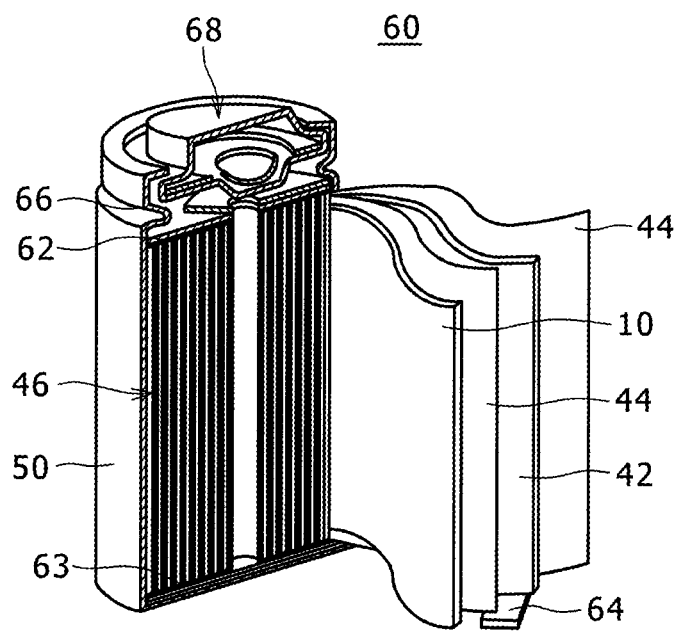
FIG. 2 is a perspective view showing an example of a non-aqueous electrolyte secondary battery according to an embodiment of the present invention cutaway in a longitudinal direction.

FIG. 2 is a perspective view showing a non-aqueous electrolyte secondary battery according to an embodiment of the present invention cutaway in a longitudinal direction. Here a situation is illustrated in which a wound electrode body 46 formed by winding a positive electrode 10 and a negative electrode 42 with a separator 44 interposed therebetween is accommodated in a battery outer can 50. In FIG.

2, when a nail or the like having a sharp tip, not shown in FIG. 2, penetrates perpendicularly to the side surface of the battery outer can 50, the nail penetrates the wound electrode body 46 formed of the negative electrode 42, the separator 44 and the positive electrode 10 stacked in this order, to cause an internal short circuit. As such an internal short circuit, there exist a short circuit between a positive electrode current collector 20 and the negative electrode 42 and a short circuit between the surface portion of a positive electrode mixture layer 21 and the negative electrode 42, and the former short circuit generates a larger amount of heat due to a short circuit. This is considered to be because a large amount of Joule heat is generated near the positive electrode current collector 20 and this Joule heat induces an exothermic reaction between the positive electrode active material 24 and the non-aqueous electrolytic solution.

Accordingly, the present inventors have considered that disposing a reaction inhibitor 30 near the positive electrode current collector 20 suppresses the reaction between the positive electrode 10 and the non-aqueous electrolytic solution. The present inventors have also invented to form a first mixture layer 22 containing the reaction inhibitor 30 on the positive electrode current collector 20 in order to dispose the reaction inhibitor 30 near the positive electrode current collector 20. Further, if the reaction inhibitor 30 is present in the surface portion of the positive electrode mixture layer 21, the reaction inhibitor 30 is considered to inhibit ion conduction during charging-discharging to deteriorate the input-output characteristics, and therefore the present inventors have invented to suppress the deterioration of input-output characteristics by disposing a second mixture layer 32 containing almost no reaction inhibitor 30 on the first mixture layer 22 so that almost no reaction inhibitor 30 is present in the surface portion of the positive electrode mixture layer 21. Although the positive electrode mixture layer 21 has a two layer constitution of the first mixture layer 22 and the second mixture layer 32 in the present embodiment, the positive electrode mixture layer 21 may be constituted of three or more layers as long as the concentration of the reaction inhibitor 30 contained in the positive electrode mixture layer 21 near the positive electrode current collector 20 is higher than that in the surface portion of the positive electrode mixture layer 21.

The first mixture layer 22 preferably contains 0.5% or more by mass and 20% or less by mass of the reaction inhibitor 30 based on the total amount of the positive electrode active material 24 as an amount expected to exert the effect of the reaction inhibitor 30. A lower limit value of less than 0.5% by mass is not preferable because the effect of the reaction inhibitor 30 cannot be sufficiently obtained. Regarding the upper limit value, a value which makes it possible to ensure a desired battery capacity is preferable because the total amount of the positive electrode active material 24 is decreased as the added amount of the reaction inhibitor 30 is increased. Further, regarding the layer thickness of the first mixture layer 22, the value obtained by dividing the layer thickness of the first mixture layer 22 by the sum of the layer thickness of the first mixture layer 22 and the layer thickness of the second mixture layer 32 is preferably less than 0.5.

The second mixture layer 32 more preferably contains no reaction inhibitor 30 in order to suppress the deterioration of output-input characteristics. As for a benchmark for containing no reaction inhibitor 30, for example, 1% or less by mass is preferable, 0.5% or less by mass is more preferable, and 0% by mass is particularly preferable based on the total amount of the positive electrode active material 24 in the second mixture layer 32.

Although procedures for manufacturing the positive electrode 10 will be described later, the interface between the first mixture layer 22 and the second mixture layer 32 is considered to have a region, for example, in a range of approximately 10 µm in which the first mixture layer 22 and the second mixture layer 32 are mixed together depending on conditions such as the particle diameter and the dispersibility of the positive electrode active material 24, the electrically conductive material 26, the binder 28 and the reaction inhibitor 30, because the second mixture layer 32 is applied to the first mixture layer 22 and thereafter rolled. Accordingly, in order to discriminate between the first mixture layer 22 and the second mixture layer 32 from the cross section of the positive electrode 10 as illustrated in FIG. 1, the mixed region thereof needs to be considered.

[Negative Electrode]

For the negative electrode, any material which has been conventionally used for the negative electrode in the non-aqueous electrolyte secondary battery may be used without particular limitation. Such a negative electrode may be obtained by, for example, mixing a negative electrode active material and a binder in water or a suitable solvent, applying the resultant mixture to a negative electrode current collector, drying the applied material, and rolling the dried material.

The negative electrode active material is a material capable of occluding and releasing lithium ions. For such a negative electrode active material, there may be used, for example, carbon materials, metals, alloys, metal oxides, metal nitrides, and carbon and silicon pre-occluding lithium. The carbon materials include natural graphite, artificial graphite, pitch-based carbon fiber and the like. Specific examples of the metals or alloys include lithium (Li), silicon (Si), tin (Sn), germanium (Ge), indium (In), gallium (Ga), lithium alloys, silicon alloys, and tin alloys. For the negative electrode active material, these materials may be used singly or in combinations of two or more thereof.

For the binder, a fluorine-containing polymer, an elastomeric polymer or the like may be used, similarly to the case of the positive electrode 10, but it is preferable to use styrene-butadiene copolymer (SBR), being an elastomeric polymer, a modified material thereof or the like. The binder may be used together with a thickener such as carboxymethyl cellulose (CMC).

For the negative electrode current collector, there is used a foil of a metal which forms almost no alloy with lithium in the potential range of the negative electrode, or a film disposed with a metal which forms almost no alloy with lithium in the potential range of the negative electrode as a surface layer, or the like. For the metal which forms almost no alloy with lithium in the potential range of the negative electrode, it is suitable to use copper, which is low cost, easy to process, and has good electron conductivity.

[Non-Aqueous Electrolyte]

The non-aqueous electrolyte contains a non-aqueous solvent and an electrolyte salt dissolved in the non-aqueous solvent. The non-aqueous electrolyte is not limited to a non-aqueous electrolytic solution, being a liquid electrolyte, but may be a solid electrolyte.

For the non-aqueous solvent, there may be used cyclic carbonates, cyclic carboxylic acid esters, cyclic ethers, open-chain carbonates, open-chain esters, open-chain ethers, nitriles, amides and the like. More specifically, there may be used ethylene carbonate (EC) and the like for the cyclic carbonates, γ-butylolactone (γ-GBL) and the like for the cyclic carboxylic acid esters, ethylmethyl carbonate (EMC), dimethyl carbonate (DMC) and the like for the open-chain esters. In addition, there may be used halogen-substituted substances which are formed by substituting a hydrogen atom of these respective non-aqueous solvents with a halogen atom such as a fluorine atom. Among others, it is preferred to mix EC as a cyclic carbonate which is a solvent with a high dielectric constant, and EMC and DMC as open-chain carbonates which are solvents with a low viscosity, and use the mixture.

As an electrolyte salt, a lithium salt generally used as a supporting electrolyte for a non-aqueous electrolyte secondary battery may be used. As the lithium salts, there may be used $LiPF_6$, $LiBF_4$, $LiClO_4$ and the like. These lithium salts may be used singly or in combinations of two or more thereof.

In addition, the non-aqueous electrolyte may contain an additive used for the purpose of forming a coating that has excellent ion conductivity on the positive electrode or the negative electrode or the like. For the additive, there may be used vinylene carbonate (VC), ethylene sulfite (ES), cyclohexylbenzene (CHB), modified substances thereof and the like. These additives may be used singly or in combinations of two or more thereof. The percentage of additive in the non-aqueous electrolyte is not particularly limited, but is suitably approximately 0.05 to 10% by mass based on the total amount of the non-aqueous electrolyte.

[Separator]

For the separator, for example, there is used a porous film having ion permeability and insulating properties disposed between the positive electrode and the negative electrode. The porous film may include microporous thin films, woven fabric, non-woven fabric and the like. A polyolefin is preferably used as the material for the separator, and more specifically polyethylene (PE), polypropylene (PP) or the like is suitable.

EXAMPLES

Hereinafter, the present invention will be more specifically illustrated in detail, referring to Examples and Comparative Examples, but the present invention is not intended to be limited to the Examples below. In the following examples, non-aqueous electrolyte secondary batteries used in Examples 1-3 and Comparative Examples 1-6 were manufactured in order to evaluate the effects of disposing the first mixture layer 22 near the positive electrode current collector 20. The specific procedures for manufacturing the non-aqueous electrolyte secondary batteries are as follows.

Example 1

[Preparation of Positive Electrode]

A lithium-containing transition metal oxide represented by the composition formula $LiNi_{0.5}Co_{0.2}Mn_{0.3}O_2$ was used for a positive electrode active material 24. A positive electrode 10 was prepared as follows. First the positive electrode active material 24 represented by $LiNi_{0.5}Co_{0.2}Mn_{0.3}O_2$, acetylene black as the electrically conductive material 26, and polyvinylidene fluoride powder as the binder 28 were mixed together so that the respective contents were 92% by mass, 5% by mass and 3% by mass to give a mixture. Lithium fluoride (LiF) as the reaction inhibitor 30 was mixed with the mixture at 5.5% by mass based on the mixture, and the resultant mixture was further mixed with an N-methyl-2-pyrrolidone (NMP) solution to prepare a positive electrode slurry 1. This positive electrode slurry 1 was applied to both surfaces of the positive electrode current collector 20 made of aluminum having a thickness of 15 μm by the doctor blade method, and was then dried and compressed using a compression roller to form the first mixture layers 22 on both surfaces.

Next, the positive electrode active material 24 represented by $LiNi_{0.5}Co_{0.2}Mn_{0.3}O_2$, acetylene black as the electrically conductive material 26, and polyvinylidene fluoride powder as the binder 28 were mixed together so that the respective contents were 92% by mass, 5% by mass and 3% by mass, and the resultant mixture was further mixed with an N-methyl-2-pyrrolidone (NMP) solution to prepare a positive electrode slurry 2. This positive electrode slurry 2 was applied to the first mixture layer 22 by the doctor blade method in an applied weight approximately three times as much as that applied to the first mixture layer 22, and then dried and compressed using a compression roller to form the first mixture layers 22 and the second mixture layers 32 on both surfaces. Then, the thicknesses of the first mixture layer 22 and the second mixture layer 32 were set to approximately 20 μm and approximately 60 μm, respectively, and the relation between the layer thicknesses of the first mixture layer 22 and the second mixture layer 32 was set to layer thickness of first mixture layer 22:layer thickness of second mixture layer 32=1:3 (i.e., the value obtained by dividing the layer thickness of the first mixture layer 22 by the sum of the layer thickness of the first mixture layer 22 and the layer thickness of the second mixture layer 32 was 0.25). Thus was obtained the positive electrode 10 formed of the positive electrode current collector 20, the first mixture layer 22 and the second mixture layer 32 stacked in this order.

[Preparation of Negative Electrode]

For the negative electrode active material, three kinds of materials of natural graphite, artificial graphite, and artificial graphite surface-coated with amorphous carbon were prepared, and a blend thereof was used. The negative electrode 42 was prepared as follows. At first, the negative electrode active material, styrene-butadiene copolymer (SBR) as a binder, and carboxymethyl cellulose (CMC) as a thickener were mixed together so that the respective contents were 98% by mass, 1% by mass and 1% by mass to give a mixture, the mixture was mixed with water to prepare slurry, and then this slurry was applied to both surfaces of a negative electrode current collector made of copper having a thickness of 10 μm by the doctor blade method to form negative electrode active material layers. Then, the layers were compressed using a compression roller to a predetermined density to give a negative electrode 42.

[Preparation of Non-Aqueous Electrolyte]

$LiPF_6$ was dissolved as the electrolyte salt at a concentration of 1.0 mol/L in a non-aqueous solvent which had been prepared by mixing ethylene carbonate (EC), ethylmethyl carbonate (EMC) and dimethyl carbonate (DMC) at a volume ratio of 3:3:4 to prepare a non-aqueous electrolytic solution, and the solution was subjected to manufacture of the battery.

[Manufacture of Cylindrical Non-Aqueous Electrolyte Secondary Battery]

Further, the positive electrode, the negative electrode, and the non-aqueous electrolytic solution thus prepared were used to manufacture a cylindrical non-aqueous electrolyte secondary battery (hereinafter, referred to as cylindrical battery) by the following procedures. A microporous film made of a polypropylene was used as the separator. FIG. 2 is a perspective view showing a cylindrical battery 60 cutaway in a longitudinal direction. The positive electrode 10 prepared as described above was shaped in a size of short sides of 55 mm and long sides of 450 mm and a collector tab 66 made of aluminum was formed at the center portion in the long side direction of the positive electrode 10. Further, the negative electrode 42 was shaped in a size of short sides of 57 mm and long sides of 550 mm and a collector tab 66 made of copper was formed at each of the edge portions in the long side direction of the negative electrode 42.

The positive electrode 10 and the negative electrode 42 were wound with a separator having a three layer structure of PP/PE/PP interposed therebetween to prepare a wound electrode body 46. Subsequently, this wound electrode body 46 was disposed with insulation plates 62 and 63 on the top and bottom respectively, and was accommodated in a cylindrical battery outer can 50 made of steel having a diameter of 18 mm and a height of 65 mm, the cylindrical battery outer can 50 also serving as a negative electrode terminal of the battery. Then, the two collector tabs 64 of the negative electrode 42 were welded to the inner bottom part of the battery outer can 50 and the collector tab 66 of the positive electrode 10 was welded to the bottom plate part of the current interruption sealing body 68 provided with a safety valve and a current interruption device. The non-aqueous electrolytic solution was supplied from the opening of the battery outer can 50, and then the battery outer can 50 was sealed with the current interruption sealing body 68 to give a cylindrical battery 60. It is noted that the cylindrical battery 60 setup was done so that the rated capacity was 1200 mAh.

Comparative Example 1

A cylindrical battery for use in Comparative Example 1 was manufactured in the same manner as that for Example 1, except that the positive electrode slurry 2 prepared in Example 1 was applied to both surfaces of the positive electrode current collector 20 by the doctor blade method, and was then dried and only second mixture layers 32 with a thickness of approximately 80 µm, to which lithium fluoride was not added as the reaction inhibitor 30, were formed on both surfaces of the positive electrode current collector 20.

Comparative Example 2

A cylindrical battery for use in Comparative Example 2 was manufactured in the same manner as that for Example 1, except that the positive electrode slurry 1 prepared in Example 1 was applied to both surfaces of the positive electrode current collector 20 by the doctor blade method, and was then dried, and first mixture layers 22 with a thickness of approximately 80 µm were formed on both surfaces of the positive electrode current collector 20 and a second mixture layer 32 was not formed.

Comparative Example 3

A cylindrical battery for use in Comparative Example 3 was manufactured in the same manner as that for Example 1, except that a slurry prepared by mixing 1.3% by mass of lithium fluoride as the reaction inhibitor 30 in the positive electrode slurry 1 in Example 1 was applied to both surfaces of the positive electrode current collector 20 by the doctor blade method, and was then dried and first mixture layers 22 with a thickness of approximately 80 µm were formed on both surfaces of the positive electrode current collector 20 and a second mixture layer 32 was not formed.

Example 2

A slurry prepared by mixing 3% by mass of melamine polyphosphate as the reaction inhibitor 30 instead of lithium fluoride in the positive electrode slurry 1 in Example 1 was applied to both surfaces of the positive electrode current collector 20 by the doctor blade method, and was then dried and first mixture layers 22 were formed on both surfaces of the positive electrode current collector 20 using a compression roller, the positive electrode slurry 2 in Example 1 was applied to the first mixture layer 22 by the doctor blade method in an applied weight approximately twice that applied in forming the first mixture layer 22, and dried to form a second mixture layer 32. Thereafter, a cylindrical battery for use in Example 2 was manufactured in the same manner as that for Example 1, except that the stacked body formed of the positive electrode current collector 20, the first mixture layer 22 and the second mixture layer 32 stacked in this order was compressed using a compression roller to give a positive electrode 10 in which the thickness of the first mixture layer 22 was 25 µm and the thickness of the second mixture layer was 45 µm.

Comparative Example 4

A cylindrical battery for use in Comparative Example 4 was manufactured in the same manner as that for Example 2, except that the positive electrode slurry 1 prepared in Example 2 was applied to both surfaces of the positive electrode current collector 20 by the doctor blade method in an applied weight approximately 3.1 times that applied in forming the first mixture layer 22 in Example 2, then dried, and first mixture layers 22 with a thickness of approximately 80 µm were formed on both surfaces of the positive electrode current collector 20 using a compression roller and a second mixture layer 32 was not formed.

Example 3

A slurry prepared by mixing 20% by mass of an aromatic phosphate ester as the reaction inhibitor 30 instead of lithium fluoride in the positive electrode slurry 1 in Example 1 was applied to both surfaces of the positive electrode current collector 20 by the doctor blade method, and was then dried, and first mixture layers 22 were formed on both surfaces of the positive electrode current collector 20 using a compression roller. The positive electrode slurry 2 in Example 1 was applied to the first mixture layer 22 by the doctor blade method in an applied weight approximately twice that applied in forming the first mixture layer 22, and dried to form a second mixture layer 32. Thereafter, a cylindrical battery for use in Example 3 was manufactured in the same manner as that for Example 1, except that the stacked body formed of the positive electrode current collector 20, the first mixture layer 22 and the second mixture layer 32 stacked in this order was compressed using a compression roller to give a positive electrode 10 in which the thickness of the first mixture layer 22 was 15 µm and the thickness of the second mixture layer 32 was 60 µm.

Comparative Example 5

A cylindrical battery for use in Comparative Example 5 was manufactured in the same manner as that for Example 3, except that the positive electrode slurry 1 prepared in Example 3 was applied to both surfaces of the positive electrode current collector 20 by the doctor blade method in an applied weight approximately 3.1 times that applied in forming the first mixture layer 22 in Example 3, then dried, and first mixture layers 22 with a thickness of approximately 75 μm were formed on both surfaces of the positive electrode current collector 20 using a compression roller and a second mixture layer 32 was not formed.

Comparative Example 6

A positive electrode slurry 2 containing no reaction inhibitor used in Example 3 was applied to both surfaces of the positive electrode current collector 20 by the doctor blade method, then dried, and first mixture layers 22 were formed on both surfaces of the positive electrode current collector 20 using a compression roller. Then the positive electrode slurry 1 containing an aromatic phosphate ester as the reaction inhibitor 30 used in Example 3 was applied to the first mixture layer 22 by the doctor blade method in an applied weight approximately ¼ of that applied in forming the first mixture layer 22, and dried to form a second mixture layer 32 containing the reaction inhibitor. Thereafter, a cylindrical battery for use in Comparative Example 6 was manufactured in the same manner as that for Example 3, except that the stacked body formed of the positive electrode current collector 20, the first mixture layer 22 and the second mixture layer 32 stacked in this order was compressed using a compression roller to give a positive electrode 10 in which the thickness of the first mixture layer 22 was 60 μm and the thickness of the second mixture layer was 10 μm.

[Evaluation of Discharge Capacity]

A charge-discharge test was performed at an environmental temperature of 25° C. for the purpose of evaluating discharge capacities in Examples 1-3 and Comparative Examples 1-6. The test method is as follows. Each of the cylindrical batteries was charged at a constant current of 1 C (1200 mA) until the cell voltage became 4.2 V, and then continuously charged at a constant voltage until the current value became 0.05 C (60 mA). Subsequently, each battery was discharged at a constant current of 1 C (1200 mA) until the cell voltage became 2.5 V, and further discharged at a constant current of ⅓ C (400 mA) until the cell voltage became 2.5 V. Table 1 shows the results of the sum of the discharge capacities at 1 C and ⅓ C.

[Evaluation of Output Characteristics]

A charge-discharge test was performed at an environmental temperature of 25° C. for the purpose of evaluating output characteristics of Examples 1-3 and Comparative Examples 1-6. First, each of the cylindrical batteries was charged at a constant current of 1 C (1200 mA) until the cell voltage became 4.2 V, and then continuously charged at a constant voltage until the current value became 0.05 C (60 mA). Thereafter, each battery was discharged at a constant current of 1 C (1200 mA) to 50% of the discharge capacity of the cylindrical battery determined in the above discharge capacity evaluation. Subsequently, each of the cylindrical batteries was discharged for 10 sec at constant currents of 1 A, 5 A, 10 A, 15 A, 20 A, 25 A, 30 A, 35 A and 40 A, respectively, and the cell voltages after 10 sec for respective discharge currents were measured. Then, the output characteristics were evaluated by reading the current value at which the cell voltage became 2.7 V. Table 1 shows the results.

TABLE 1

| | Positive electrode mixture layer | | | Input-output characteristics | | |
|---|---|---|---|---|---|---|
| | Added quantity of reaction inhibitor (% by mass) | 1st mixture layer thickness (μm) | 2nd mixture layer thickness (μm) | Discharge capacity (mAh) | Output current (A) | Material for reaction inhibitor |
| Example 1 | 5.5 | 20 | 60 | 1201 | 35 | LiF |
| Comparative Example 1 | None | None | 80 | 1215 | 36 | — |
| Comparative Example 2 | 5.5 | 80 | None | 1150 | 32 | LiF |
| Comparative Example 3 | 1.3 | 80 | None | 1203 | 34 | LiF |
| Example 2 | 3 | 25 | 45 | 1210 | 36 | Melamine polyphosphate |
| Comparative Example 4 | 3 | 80 | None | 1202 | 28 | Melamine polyphosphate |
| Example 3 | 20 | 15 | 60 | 1205 | 35 | Aromatic phosphate ester |
| Comparative Example 5 | 20 | 75 | None | 1159 | 15 | Aromatic phosphate ester |
| Comparative Example 6 | 20 | 60 | 15 | 1198 | 22 | Aromatic phosphate ester |

As shown in Table 1, the discharge capacity in Example 1 and Comparative Example 3 was approximately 1% less than that in Comparative Example 1, while in the case of Comparative Example 2, there was approximately 5% reduction. Further, the output characteristics in Example 1 were nearly equivalent to those in Comparative Example 1, while Comparative Examples 2 and 3, in which the reaction inhibitor 30 was contained almost homogenously in the first mixture layer 21, resulted in a reduced output. The proportion of the reaction inhibitor 30 with respect to the total amount of the positive electrode active material 24 in Example 1 was approximately 1.3%, which was almost the same as in Comparative Example 3, and accordingly it was confirmed that Example 1, in which the concentration of the reaction inhibitor 30 was set to be high near the positive electrode current collector 20, did not affect input-output characteristics such as discharge capacity and output characteristics.

The output characteristics in Examples 1-3 were equivalent to that in Comparative Example 1, while Comparative Examples 2-6, in which the reaction inhibitor 30 was contained almost homogenously in the positive electrode first mixture layer 21, resulted in a reduced output. Comparative Example 6, in which the reaction inhibitor 30 was not contained in the positive electrode first mixture layer 21 but was contained in the second mixture layer 32, also resulted in deteriorated output characteristics.

[Nail Penetration Test]

A nail penetration test was performed for each of the cylindrical batteries in a full-charged state in Examples 1-3 and Comparative Examples 1-6 for the purpose of understanding the reaction-suppressing effect by forming the first mixture layer 22 on the positive electrode current collector 20. The test method is as follows. First, each of the cylindrical batteries was charged at a constant current of 1.0 C (1200 mA) at an environmental temperature of 25° C. until the cell voltage became 4.2 V, and then continuously charged at a constant voltage until the current value became 0.05 C (60 mA). Subsequently, the center portion in the side surface of each of the cylindrical batteries was contacted with the tip of a wire nail with a thickness of 3 mmφ having a sharp tip under an environment in which the battery temperature was 65° C., and the wire nail was pushed in along the diameter direction of each of the cylindrical batteries at a velocity of 80 mm/sec, and when the wire nail completely penetrated each of the cylindrical batteries, the pushing in of the wire nail was stopped. Then, the behavior of the battery temperature after pushing in was measured by contacting a thermocouple on the battery surface. As battery temperatures, the battery temperatures 5 and 10 sec after the pushing in and the maximum attained temperature were evaluated. The results of battery temperatures are shown in Tables 2-1, 2-2 and 2-3.

TABLE 2-1

Battery temperature (a value within a parenthesis is a difference from Comparative Example 1)

|  | After 5 sec (° C.) | After 10 sec (° C.) | Maximum attained temperature (° C.) |
|---|---|---|---|
| Example 1 | 216 (−80) | 303 (−60) | 325 (−47) |
| Comparative Example 1 | 296 (—) | 364 (—) | 372 (—) |
| Comparative Example 2 | 228 (−68) | 299 (−65) | 320 (−52) |
| Comparative Example 3 | 309 (+13) | 319 (−44) | 327 (−45) |

TABLE 2-2

Battery temperature (a value within a parenthesis is a difference from Comparative Example 4)

|  | After 5 sec (° C.) | After 10 sec (° C.) | Maximum attained temperature (° C.) |
|---|---|---|---|
| Example 2 | 237 (−59) | 295 (−46) | 299 (−44) |
| Comparative Example 4 | 296 (—) | 341 (—) | 343 (—) |

TABLE 2-3

Battery temperature (a value within a parenthesis is a difference from Comparative Example 5)

|  | After 5 sec (° C.) | After 10 sec (° C.) | Maximum attained temperature (° C.) |
|---|---|---|---|
| Example 3 | 261 (+2) | 291 (−Absorption layer 30) | 295 (−54) |
| Comparative Example 5 | 259 (—) | 321 (—) | 349 (—) |
| Comparative Example 6 | 290 (+31) | 340 (+19) | 355 (+6) |

As seen from Table 2-1, Example 1 resulted in lower battery temperatures after 5 sec and 10 sec than those in Comparative Example 1, as well as a lower maximum attained temperature. The time at which the battery temperature reached the maximum attained temperature was after 10 sec in all of Example 1 and Comparative Examples 1-3. In particular, it can be seen that in Example 1 the battery temperature was lower than or almost equivalent to those in Comparative Examples 1-3 both after 5 sec and 10 sec in the process of battery temperature elevation, and therefore the heat generation in the battery was suppressed. From this fact, it can be considered that, after heat generation due to a short circuit between the positive electrode current collector and the negative electrode active material, the reaction inhibitor 30 present near the positive electrode current collector 20 suppressed the reaction between the positive electrode active material and the non-aqueous electrolytic solution induced by this heat and therefore could suppress the heat generation in the battery. In addition, even compared with the batteries in Comparative Examples 2-3, in which a positive electrode 10 having no second mixture layer 22 and consisting of only a first mixture layer 22 in which a reaction inhibitor 30 was almost homogeneously present in the positive electrode mixture layer 21 was used, the battery in Example 1 had an effect of significantly suppressing the elevation of the battery temperature.

Furthermore, as shown in Table 2-2 and Table 2-3, in both of Example 2 and Example 3, in which a melamine polyphosphate and an aromatic phosphate ester were used as a reaction inhibitor material, respectively, an effect of suppressing the elevation of the battery temperature could be confirmed in the process of battery temperature elevation even compared with the batteries in Comparative Example 4 and Comparative Example 5. In addition, a high effect of suppressing the elevation of the battery temperature could be confirmed in Example 3 even compared with a configuration with a reaction inhibitor contained in the separator side of the positive electrode active material such as Comparative Example 6.

Thus, a positive electrode for a non-aqueous electrolyte secondary battery wherein the concentration of a reaction inhibitor contained in the positive electrode mixture layer near the positive electrode current collector is higher than that in the surface layer portion of the positive electrode mixture layer, and a non-aqueous electrolyte secondary battery comprising this positive electrode for a non-aqueous electrolyte secondary battery, suppress the reaction between the positive electrode active material and the non-aqueous electrolytic solution due to heat generation in an internal short circuit caused by a nail penetration or the like, and have excellent input-output characteristics.

REFERENCE SIGNS LIST

10 positive electrode, 20 positive electrode current collector, 21 positive electrode mixture layer, 22 first mixture layer, 24 positive electrode active material, 26 electrically conductive material, 28 binder, 30 reaction inhibitor, 32 second mixture layer, 42 negative electrode, 44 separator, 46 wound electrode body, 50 battery outer can, 60 cylindrical battery, 62, 63 insulation plate, 64 negative electrode current collector tab, 66 positive electrode current collector tab, 68 current interruption sealing body.

The invention claimed is:

1. A positive electrode for use in a non-aqueous electrolyte secondary battery,
the positive electrode comprising a positive electrode current collector and a positive electrode mixture layer formed on the positive electrode current collector,
the positive electrode mixture layer comprising a first mixture layer containing a positive electrode active material and a reaction inhibitor to suppress a thermal reaction between the positive electrode active material and a non-aqueous electrolyte, and a second mixture layer comprising the positive electrode active material,
the positive electrode formed of the positive electrode current collector, the first mixture layer and the second mixture layer stacked in this order, wherein a concentration of the reaction inhibitor contained in the positive electrode mixture layer near the positive electrode current collector is higher than that in a surface layer portion of the positive electrode mixture layer,
the reaction inhibitor being in the form of at least one of powder and particulate that are substantially insoluble in the non-aqueous electrolyte.

2. The positive electrode for a non-aqueous electrolyte secondary battery according to claim 1,
wherein the reaction inhibitor is at least one selected from the group consisting of lithium fluoride, aluminum fluoride, and a fluoride.

3. The positive electrode for a non-aqueous electrolyte secondary battery according to claim 1,
wherein the reaction inhibitor is contained at 0.5% or more by mass and 20% or less by mass based on a total amount of the positive electrode active material in the first mixture layer.

4. The positive electrode for a non-aqueous electrolyte secondary battery according to claim 1,
wherein a value obtained by dividing a layer thickness of the first mixture layer by a sum of the layer thickness of the first mixture layer and a layer thickness of the second mixture layer is less than 0.5.

5. A non-aqueous electrolyte secondary battery comprising a positive electrode, a negative electrode and a non-aqueous electrolyte,
the positive electrode comprising a positive electrode current collector and a positive electrode mixture layer formed on the positive electrode current collector,
the positive electrode mixture layer comprising a first mixture layer containing a positive electrode active material and a reaction inhibitor to suppress a thermal reaction between the positive electrode active material and the non-aqueous electrolyte, and a second mixture layer comprising the positive electrode active material,
the positive electrode formed of the positive electrode current collector, the first mixture layer and the second mixture layer stacked in this order, wherein a concentration of the reaction inhibitor contained in the positive electrode mixture layer near the positive electrode current collector is higher than that in a surface layer portion of the positive electrode mixture layer,
the reaction inhibitor being at least one selected from the group consisting of a phosphate ester, a melamine-acid salt, and a fluoride,
the reaction inhibitor being in the form of at least one of powder and particulate that are substantially insoluble in the non-aqueous electrolyte.

6. The non-aqueous electrolyte secondary battery according to claim 5,
wherein the reaction inhibitor is contained at 0.5% or more by mass and 20% or less by mass based on a total amount of the positive electrode active material in the first mixture layer.

7. The non-aqueous electrolyte secondary battery according to claim 5,
wherein a value obtained by dividing a layer thickness of the first mixture layer by a sum of the layer thickness of the first mixture layer and a layer thickness of the second mixture layer is less than 0.5.

8. The non-aqueous electrolyte secondary battery according to claim 5,
wherein the reaction inhibitor is at least one selected from the group consisting of lithium fluoride, aluminum fluoride, an aromatic condensed phosphate ester, melamine pyrophosphate, melamine sulfate, melamine cyanurate, and melamine borate.

* * * * *